Patented Jan. 22, 1946

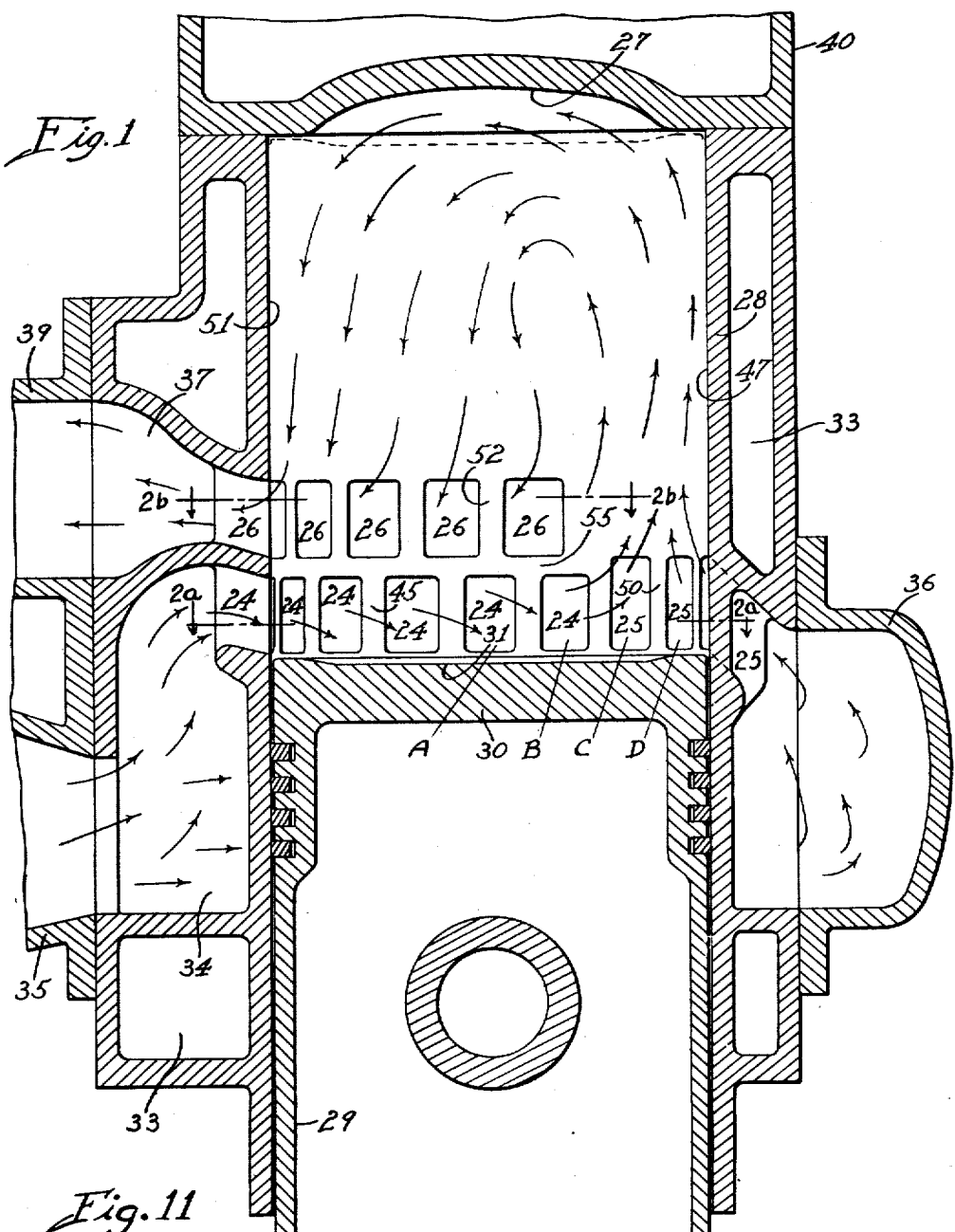
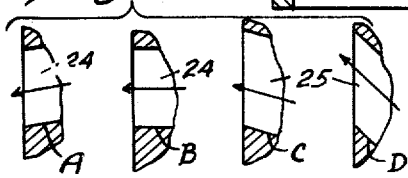

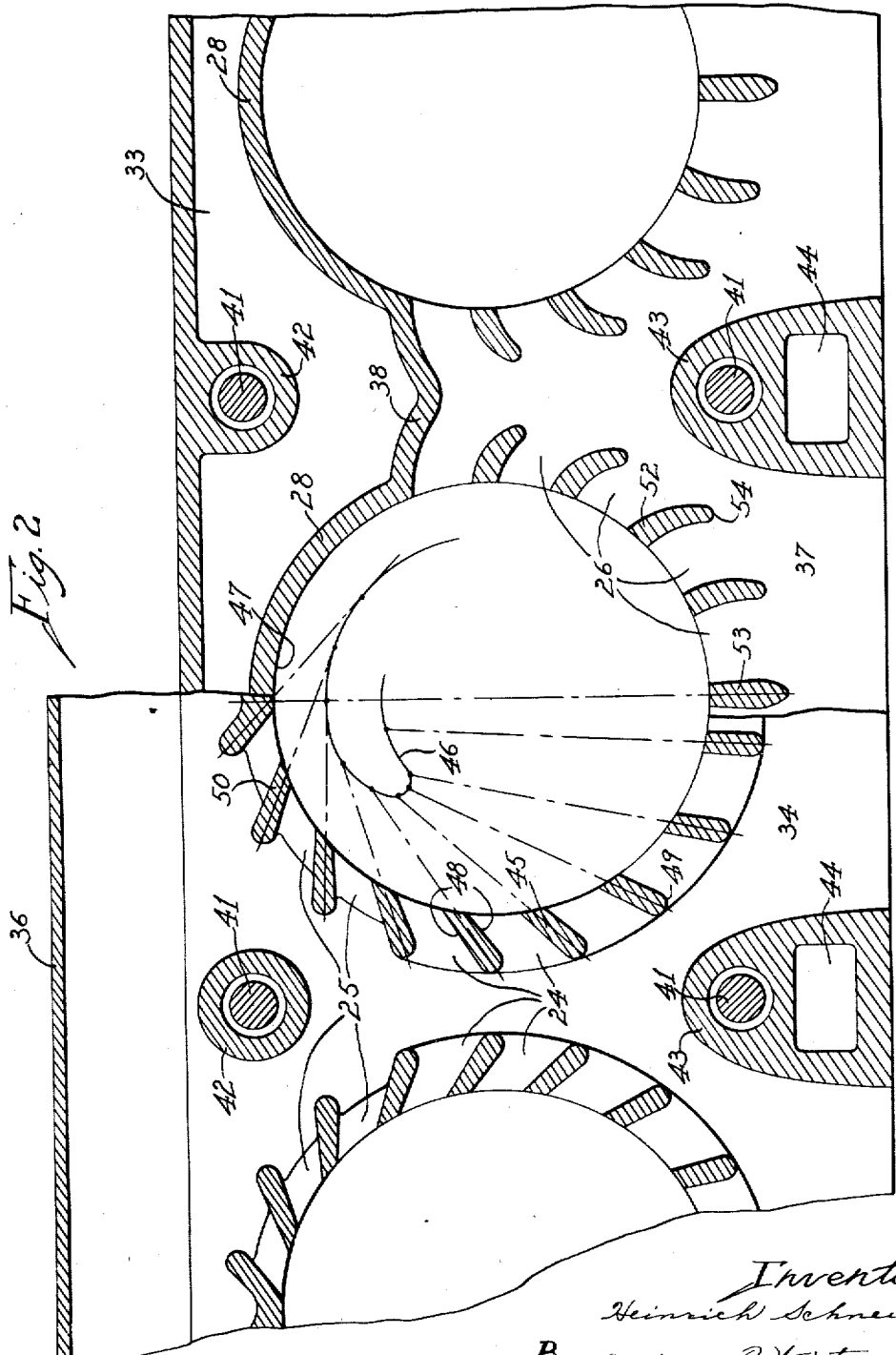

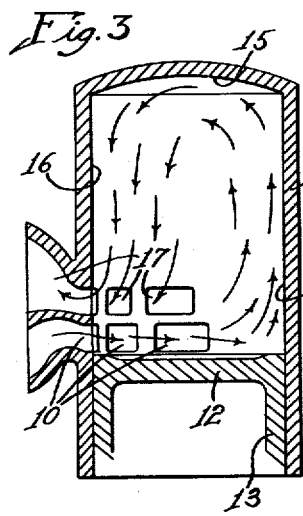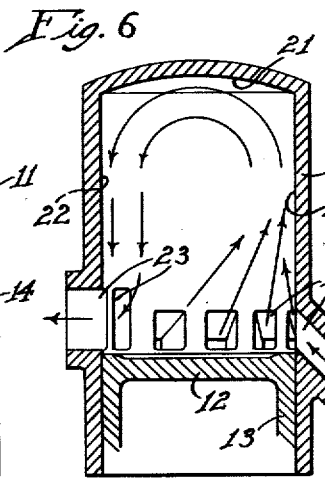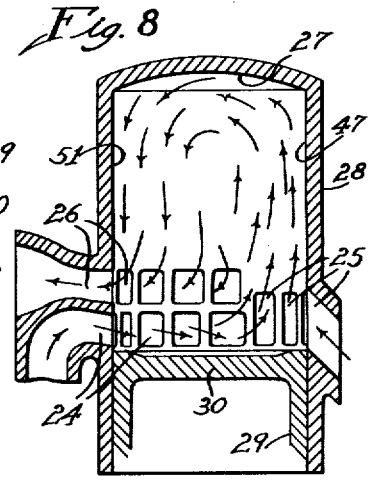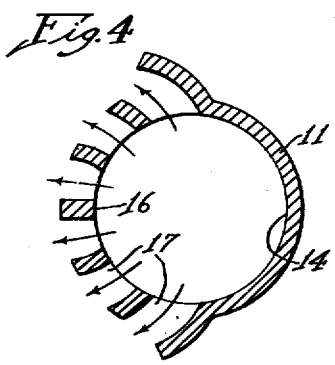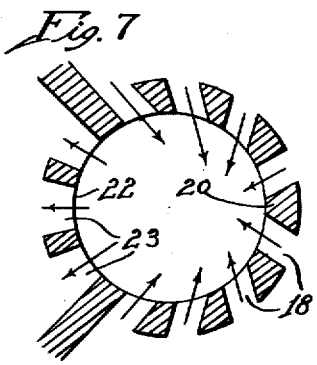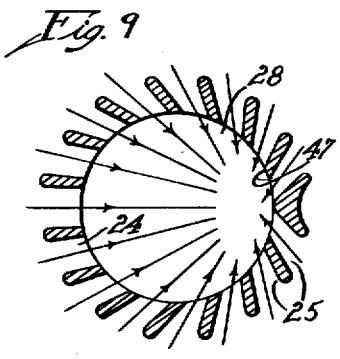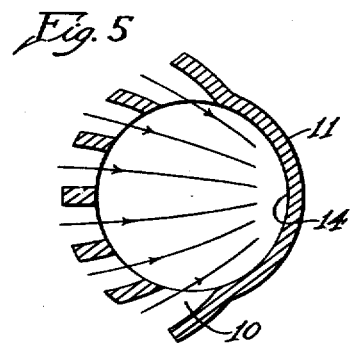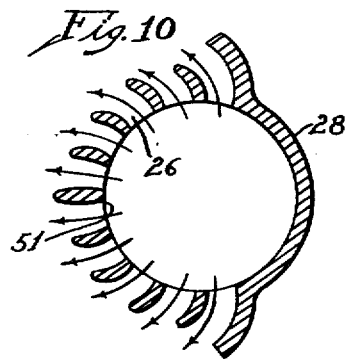

2,393,342

UNITED STATES PATENT OFFICE 2,393,342

TWO-CYCLE INTERNAL-COMBUSTION ENGINE

Heinrich Schneider, Hamilton, Ohio, assignor to Schneider Brothers Company, a copartnership composed of Heinrich Schneider and Viva Schneider, Hamilton, Ohio, and Adolph G. Schneider and Erna Schneider, Muncie, Ind.

Application February 9, 1944, Serial No. 521,605

26 Claims. (Cl. 123—65)

This invention relates to a new and improved internal combustion engine, and is particularly concerned with improvements in the scavenging and charging facilities of two-cycle Diesel engines.

The salient idea of the present invention is to open up the inlet and outlet port areas as much as possible and stream line air and exhaust passages, conduits, manifolds, and ports for minimum flow resistance, to obtain maximum power output at high engine speeds and supercharge the cylinder with air at higher pressure by virtue of back pressure produced by an exhaust turbine supercharger. All restriction devices, like valves and commonly used loading devices, in the air or exhaust conduits are eliminated, whereby to provide wide open passages for air and exhaust gases. The purpose is to get at high engine speed a maximum amount of air through the engine, inasmuch as the maximum engine power obtainable increases with the amount of air consumed by the engine.

Two methods of scavenging have been used extensively heretofore, although both have well recognized objections. One of these is known as the loop-flow method, so called because the scavenging air is admitted through down-flow scavenging ports from one side of the cylinder and flows over the piston and against the opposite side wall and is there deflected upwardly and describes a loop as it travels upwardly toward the cylinder head and down again, finally being discharged through the exhaust ports arranged in the cylinder wall in a row above the scavenging ports. The other method, the back-flow scavenging, involves the use of a row of upflow ports in one side of the cylinder directed toward the cylinder wall opposite the exhaust ports, which are in a row on the other side of the cylinder from the scavenging ports, the two sets of ports forming a single belt around the cylinder, the scavenging ports taking up half or more of the circumference and the exhaust ports the other half or less of the circumference. With that arrangement there is an upward flow of the scavenging air on one side of the cylinder and a downflow of the exhaust gases followed by scavenging air on the exhaust port side, thus describing a loop similarly as with the other arrangement of ports.

Both old methods are objectionable because only a portion of the cylinder circumference is available for scavenging ports, and in the backflow method less than half of the circumference is available for the exhaust ports, and in the loop-flow method the scavenging air impinges against the opposite cylinder wall thus resulting in a serious drop in air velocity. All of these factors tend to reduce the engine's efficiency and limit its speed.

It is, therefore, the principal object of my invention to provide a new scavenging system, which, in effect, combines the best features of the above described two older systems, making use of both downflow and upflow scavenging ports to produce the loop-flow without any impingement of the incoming air on the cylinder wall. The downflow and upflow scavenging ports, in accordance with my invention, together take up the entire circumference, the downflow ports extending in a row around about one-half or more of the circumference and being below a row of exhaust ports, and the upflow scavenging ports completing the belt of scavenging ports and extending in a row over the remaining portion of the circumference. With this new arrangement of scavenging ports, the air from the downflow ports flowing over the top of the piston does not strike the opposite cylinder wall and lose part of its flow energy and velocity, but is deflected upwardly by the air admitted through the upflow ports, thereby directing it toward the cupola-shaped cylinder head, where it is deflected so as to flow downwardly along the opposite cylinder wall toward the exhaust ports. This arrangement has the advantages of affording larger scavenging port areas so that the necessary scavenging pressure and with it the power required to drive the blower is reduced, whereby economical operation at higher engine speeds becomes possible.

In accordance with my invention, the scavenging ports viewed along the cylinder axis are directed toward a small area located about half way between the cylinder axis and the cylinder wall in which the upflow scavenging ports are located, whereby to eliminate any likelihood of impingement of scavenging air from the downflow port on the cylinder wall, as in the prior methods, and insure upward travel along the cylinder wall for loop-flow.

Another feature of my invention is the provision of ribs between the scavenging ports converging toward the area inside the cylinder previously mentioned, said ribs being tapered slightly in the direction stated and having rounded outer edges whereby to reduce substantially to a minimum by this streamlining the resistance to inflow of air.

Another feature of my invention is the provision of ribs separating the exhaust ports, which are also of streamlined shape to direct the exhaust gases toward the exhaust manifold with least turbulence and least loss in exhaust flow energy and velocity.

Still another feature of my invention is the arrangement of the ribs between the exhaust ports offset substantially midway between the ribs separating the downflow scavenging ports therebeneath, so that there is the desired elasticity in the wall construction required for heat deformation.

Still another feature of my invention consists in having multiple cylinders arranged in a block having all of the aforesaid ports and ribs cast integral with the block, the block also having ducts cast integral therewith to receive tie-rods for interconnecting the top of the cylinder block with the crankcase, thus relieving the cylinder block and particularly the ported section thereof of tension stresses.

The invention is illustrated in the accompanying drawings, in which—

Fig. 1 is a vertical section through a cylinder and piston of an engine made in accordance with my invention;

Fig. 2 is a horizontal section through three cylinders of an engine block, the left-hand half being taken in the lower plane 2a—2a of the scavenging ports and the right-hand half in the upper plane 2b—2b of the exhaust ports;

Figs. 3, 4, and 5 are diagrammatic views illustrating the commonly known loop-flow method of scavenging, Fig. 4 being a horizontal section through the exhaust ports and Fig. 5 a horizontal section through the scavenging ports;

Figs. 6 and 7 are diagrammatic views illustrating the commonly known back-flow method of scavenging, Fig. 7 being a horizontal section through the ports;

Figs. 8, 9, and 10 are diagrammatic views illustrating the present novel method of scavenging, Fig. 9 being a section through the scavenging ports, and Fig. 10 a horizontal section through the exhaust ports, and Fig. 11 is a series of small vertical sections through the ports A, B, C, and D in Fig. 1, illustrating the difference in angularity.

The same reference numerals are applied to corresponding parts throughout the views.

Referring briefly to Figs. 3, 4, and 5, the reference numeral 10 designates the downflow scavenging ports in the wall of the cylinder 11 through which air is directed tangentially over the top 12 of the piston 13 toward the opposite wall 14. The air strikes the wall 14 nearly at right angles and is thereby deflected and flows upwardly toward the cylinder head 15, where it is again deflected and reverses its direction of flow, going downwardly along the cylinder wall 16 and out through the exhaust ports 17, driving ahead of it the exhaust gases. This is the loop-flow method, which has been used extensively, despite the fact that there are obviously two objections: The scavenging air striking the wall 14 substantially at right angles loses much of its flow energy and velocity, and the scavenging port area is relatively small thus necessitating higher scavenging pressure and accordingly increased power consumption for driving the blower. The net result is an engine of limited speed and power.

Referring briefly to Figs. 6 and 7, illustrating the back-flow method of scavenging, the scavenging air enters the upflow scavenging ports 18 provided in the wall of the cylinder 19. These ports 18 take up half or more of the circumference, as indicated in Fig. 7, and are directed toward the wall 20. The air flows upwardly along the wall 20 toward the cylinder head 21 and is there deflected again so as to flow downwardly along the wall 22, driving ahead of it the exhaust gases through the exhaust ports 23. These ports 23, as shown in Fig. 7, are in a row extending around about half or less of the circumference of the cylinder. This method of scavenging has the objection that there is limited scavenging port area by reason of the location of the scavenging and exhaust ports in the same plane. The net result is an engine with limited speed and power.

Referring now briefly to Figs. 8, 9, and 10, illustrating the present improved method of scavenging, 24 designates the downflow scavenging ports, 25 the upflow scavenging ports, and 26 the exhaust ports provided in a row above the downflow scavenging ports. With this arrangement, the air from the downflow ports 24 flowing over the piston top 30 does not ram against the opposite cylinder wall and lose part of its flow energy and velocity, but is directed upwardly at substantially its initial velocity by the air entering through the upflow ports 25. This important fact plus the fact that the cylinder head 27 is given a distinct cupola shape for efficient reversal of the direction of the air results in this engine being operable at higher speeds and delivering more power. It is manifest that with the larger scavenging port area afforded by a complete belt of scavenging ports 24, the necessary scavenging pressure is reduced and, therefore, the power required to drive the blower is reduced and the exhaust gases are more thoroughly expelled. The full belt of scavenging ports provide for cooling of the whole circumference of the piston top, thus allowing for higher power capacity of the engine.

Referring now to Figs. 1 and 2, 28 designates one of the cylinders of my improved engine and 29 the piston therein. The head 30 of the piston has the top thereof dished or concaved slightly, as shown at 31. The cylinders 28 are cast in multiple and are mounted on a crank case and have intercommunicating water jackets 33. 34 are cored air passages extending circumferentially of the several cylinders, to which air ducts 35 are connected for delivery of scavenging air under pressure from a blower, 36 being a duct suitably supplied with air from the same blower and interconnecting the passages 34 on the opposite side of the block from the ducts 35 as appears in the left hand portion of Fig. 2. 37 designates the exhaust passages which are interconnected, as indicated at 38 in Fig. 2, and have communication with an exhaust manifold 39. The cylinder head 40, in which the cupola-shaped cylinder head portions 27 are provided, is arranged to be secured on the cylinder block in any suitable manner, but is preferably connected with the crank case by tie-rods 41 entered through hollow columns in which ducts 42 and 43 are provided therefor between the cylinders and cast integral with the block, the columns in which ducts 43 are provided also having passages 44 therein forming a part of the water jacket for circulation of cooling water around the cylinders.

The downflow scavenging ports 24 are provided in a row extending about two-thirds of the way around the circumference of the cylinder and the ribs 45 therebetween are all directed toward an area 46 about midway between the axis of the cylinder and the opposite side wall 47 in which the upflow scavenging ports 25 are provided. The ribs 45 are tapered inwardly toward the area 46, as indicated by the inwardly converging sides 48 thereof, and the outer edges 49 are rounded to complete the streamlining, with a view to reducing substantially to a minimum the resistance to air flow through the ports 24. The ribs 50 between the upflow ports 25 are similarly directed toward the area 46, as clearly appears in Fig. 2, and are likewise tapered and of generally streamlined section. As a result of this arrangement of ports and direction of ribs, most of the scavenging air, about two-thirds of it, enters through the downflow scavenging ports 24 and is discharged tangentially over the concave top 31 of the piston head toward the area 46, but before this air reaches the opposite side wall 47 of the cylinder, it encounters the air delivered into the cylinder through the upflow scavenging ports 25 and is, therefore, directed upwardly along the wall 47 substantially without any loss in flow energy and velocity. The cupola-shaped inside 27 of the cylinder head directs the air downwardly to complete the loop and the air flows downwardly along the other wall 51 toward and out through the exhaust ports 26, driving ahead of it the exhaust gases.

The ribs 52 separating the exhaust ports 26 are all curved, with the exception of the middle rib 53, to direct the exhaust gases toward the manifold 39, and are, moreover, tapered toward the outer edges 54 to give a generally streamlined section. The ribs 52 are, moreover, offset relative to the ribs 45 to points substantially midway between the ribs 45 in order that the substantially horizontal wall 55 separating the two rows of ports 24 and 26 will provide portions having a certain elasticity to compensate for heat deformation. The exhaust ports 26, as clearly appears in Fig. 2, are in a row extending more than half the way around the circumference of the cylinder opposite the upflow scavenging ports 25 and above the downflow scavenging ports 24.

The upflow scavenging ports 25 are preferably made of greater height than the downflow scavenging ports 24, as the latter are limited in height by the exhaust ports 26 above them. For high speed engines, the top of the exhaust ports 26 is arranged higher than usual, preferably between 25 and 50% of the piston stroke, to provide large areas for the exhaust and inlet ports. Instead of making all upflow scavenging ports 25 at the same angle in relation to the cylinder bore, the angle of a few intermediate ports 24—25 marked A, B, C, and D in Fig. 1 are at intermediate angles changing by graduations from the angle of the downflow ports 24 to the angle of the upflow ports 25, as illustrated in Fig. 11. The ribs between the ports are made as narrow as practical, to have as much cylinder circumference available for the ports as possible.

The operation of the scavenging system of the present invention is believed to be clear from the previous description of Figs. 8–10. The invention avoids the objections of both previous arrangements of ports while retaining their advantageous features, larger scavenging port area being obtained by reason of the provision of a complete belt of scavenging ports, which makes possible more perfect scavenging at relatively low scavenging pressure. The engine accordingly can be operated at higher speeds and with higher power output. This improved engine provides in combination with an exhaust turbine supercharger a most economical high power capacity power unit.

Regarding the claims, it should be understood that the term "under" where used to specify the location of the scavenging ports in relation to the exhaust ports is not to be taken as implying any limitation to vertical engines, but in a broader sense means that the scavenging ports are farther from the closed end of the cylinder than the exhaust ports.

I claim:

1. A two-cycle engine, comprising a cylinder and a piston therein, said cylinder having a plurality of exhaust ports arranged in a row on one side of the cylinder, and a plurality of crossflow scavenging ports arranged in a row under the exhaust ports for directing scavenging air tangentially over the top of the piston, and a plurality of upflow scavenging ports arranged in a row on the other side of the cylinder for directing scavenging air away from the piston toward the closed end of the cylinder, all of the scavenging and exhaust ports being symmetrical with respect to a longitudinal plane through the axis of said cylinder.

2. A two-cycle engine, comprising a cylinder having a plurality of exhaust ports arranged in a row on one side of the cylinder and scavenging ports under the exhaust ports, including downflow and upflow scavenging ports, all of the scavenging and exhaust ports being symmetrical with respect to a longitudinal plane through the axis of said cylinder.

3. A two-cycle engine, comprising a cylinder having a continuous belt of scavenging ports around the whole circumference of said cylinder, and a plurality of exhaust ports arranged in a row above the scavenging ports around only a part of the circumference of said cylinder, all of the scavenging ports directing scavenging air away from the exhaust ports and extending symmetrically with respect to a longitudinal plane through the axis of said cylinder.

4. A two-cycle engine, comprising a cylinder and a piston therein, said cylinder having a continuous belt of scavenging ports around the whole circumference of said cylinder, and a plurality of exhaust ports arranged in a row above the scavenging ports around only a part of the circumference of said cylinder, the scavenging ports under the exhaust ports being arranged to deliver air streams across the cylinder tangentially over the top of the piston, the scavenging ports located diametrically opposite the exhaust ports being arranged to deliver air streams upwardly away from the piston and away from the exhaust ports toward the closed end of the cylinder, all of said ports being symmetrical with respect to a longitudinal plane through the axis of said cylinder.

5. A two-cycle engine, comprising a cylinder and a piston therein, said cylinder having a continuous belt of scavenging ports round the whole circumference of said cylinder, and a plurality of exhaust ports arranged in a row above the scavenging ports around only a part of the circumference of said cylinder, the scavenging ports under the exhaust ports being arranged to deliver air streams across the cylinder tangentially over the top of the piston, the scavenging ports located diametrically opposite the exhaust ports being arranged to deliver air streams upwardly away from the piston toward the closed end of the cylinder, the scavenging ports intermediate the cross-flow and upflow ports on opposite sides of the cylinder being arranged to deliver air streams at at least one intermediate angle, all of said ports being symmetrical with respect to a longitudinal plane through the axis of said cylinder.

6. A two-cycle engine, comprising a cylinder and a piston therein, said cylinder having a continuous belt of scavenging ports around the whole circumference of said cylinder, and a plurality of exhaust ports arranged in a row above the scavenging ports around only a part of the circumference of said cylinder, the scavenging ports under the exhaust ports being arranged to deliver air streams across the cylinder over the top of the piston, the scavenging ports located diametrically opposite the exhaust ports being arranged to deliver air streams upwardly away from the piston toward the closed end of the cylinder, the scavenging ports intermediate the cross-flow and upflow ports on opposite sides of the cylinder being arranged to deliver air streams at intermediate angles, the angles changing gradually from the angle of the cross-flow scavenging ports to the extreme upward inclination of the upflow scavenging ports.

7. A two-cycle engine, comprising a cylinder having a continuous belt of scavenging ports around the whole circumference of said cylinder, and a plurality of exhaust ports arranged in a row above the scavenging ports around in excess of half of the circumference of said cylinder, the scavenging ports directing air away from the exhaust ports, all of said ports extending symmetrically with respect to a longitudinal plane through the axis of said cylinder.

8. A two-cycle engine, comprising a cylinder and a piston therein, said cylinder having a continuous belt of scavenging ports around the whole circumference of said cylinder, and a plurality of exhaust ports arranged in a row above the scavenging ports around only a part of the circumference of said cylinder, the scavenging ports under the exhaust ports being arranged to deliver air streams crosswise over the top of the piston, the scavenging ports located diametrically opposite the exhaust ports being arranged to deliver air streams upwardly away from the piston toward the closed end of the cylinder, the cross-flow scavenging ports extending throughout more than half of the circumference of said cylinder and the upflow scavenging ports extending throughout the balance, namely, less than half of the circumference of said cylinder, the cross-flow and upflow scavenging ports and also the exhaust ports being symmetrical with respect to a longitudinal plane through the axis of said cylinder.

9. A two-cycle engine, comprising a cylinder and a piston therein, said cylinder having a continuous belt of scavenging ports around the whole circumference of said cylinder, and a plurality of exhaust ports arranged in a row above the scavenging ports around only a part of the circumference of said cylinder, the scavenging ports under the exhaust ports being arranged to deliver air streams crosswise over the top of the piston, the scavenging ports located diametrically opposite the exhaust ports being arranged to deliver air streams upwardly away from the piston toward the closed end of the cylinder, all of said scavenging ports in projection on a plane normal to the axis of said cylinder being directed toward a small but elongated, generally arcuate-shaped area inside the cylinder located halfway between the axis of the cylinder and that side of the cylinder in which the upflow scavenging ports are provided.

10. A two-cycle engine, comprising a cylinder and a piston therein, said cylinder having a continuous belt of scavenging ports around the whole circumference of said cylinder, and a plurality of exhaust ports arranged in a row above the scavenging ports around only a part of the circumference of said cylinder, the scavenging ports under the exhaust ports being arranged to deliver air streams crosswise over the top of the piston, the scavenging ports located diametrically opposite the exhaust ports being arranged to deliver air streams upwardly away from the piston toward the closed end of the cylinder, said cylinder having ribs separating said scavenging ports, which are of inwardly-tapered cross-section with rounded outer edges, whereby to reduce resistance to inflow of air into said cylinder.

11. A two-cycle engine, comprising a cylinder and a piston therein, said cylinder having a continuous belt of scavenging ports around the whole circumference of said cylinder, and a plurality of exhaust ports arranged in a row above the scavenging ports around only a part of the circumference of said cylinder, the scavenging ports under the exhaust ports being arranged to deliver air streams crosswise over the top of the piston, the scavenging ports located diametrically opposite the exhaust ports being arranged to deliver air streams upwardly away from the piston toward the closed end of the cylinder, said cylinder having ribs separating said exhaust ports, which are of generally streamlined cross-section and curved to direct the outflow of exhaust gases along predetermined courses from said cylinder with reduced turbulence and reduced loss in exhaust flow energy.

12. A two-cycle engine, comprising a cylinder and a piston therein, said cylinder having a continuous belt of scavenging ports around the whole circumference of said cylinder, and a plurality of exhaust ports arranged in a row above the scavenging ports around only a part of the circumference of said cylinder, the scavenging ports under the exhaust ports being arranged to deliver air streams substantially tangentially across the top of the piston, the scavenging ports located diametrically opposite the exhaust ports being arranged to deliver air streams upwardly away from the piston toward the closed end of the cylinder, the scavenging ports on both sides of a median plane longitudinally of said cylinder through the middle of the row of exhaust ports being directed at varying angles with respect to radii of said cylinder, increasing in angularity relative to the radii from the exhaust port side of the cylinder toward the opposite side, the exhaust ports being substantially radially directed.

13. The method of scavenging a two-cycle engine, which includes the steps of delivering air in a downward direction from one side of the cylinder substantially tangentially across the top of the piston toward the opposite side of the cylinder, and delivering other air in an upward direction from the latter side of the cylinder in directions that are symmetrical with respect to a longitudinal plane through the axis of said cylinder so as to cause the first mentioned air to be directed upwardly with it to flow upwardly substantially without turbulence along the latter side of the cylinder toward the closed end of the cylinder.

14. The method of scavenging a two-cycle engine, which includes the steps of delivering air in a crosswise direction from one side of the cylinder tangentially over the top of the piston toward the opposite side of the cylinder, delivering other air in an upward direction from the latter side of the cylinder in directions that are symmetrical with respect to a longitudinal plane through the axis of said cylinder so as to cause the first mentioned air to be directed upwardly with it to flow upwardly substantially without turbulence along the latter side of the cylinder toward the closed end of the cylinder, and discharging the exhaust gases from said cylinder above the point of first mentioned delivery of scavenging air, whereby to obtain the combined advantages of the so-called loop scavenging methods and the so-called backflow scavenging method.

15. A multi-cylinder two-cycle engine, comprising a cylinder block, including a plurality of spaced substantially parallel cylinders, pistons for said cylinders, each of said cylinders having a continuous belt of scavenging ports around the whole circumference of said cylinder, and a plurality of exhaust ports arranged in a row above the scavenging ports round only a part of the circumference of said cylinder, the scavenging ports under the exhaust ports being arranged to deliver air streams downwardly over the top of the piston, the scavenging ports diametrically opposite the exhaust ports being arranged to deliver air streams upwardly away from the piston toward the closed end of the cylinder, two scavenging manifolds extending lengthwise of said cylinder block on opposite sides thereof adapted for delivering scavenging air simultaneously to the downflow and upflow scavenging ports, and a single exhaust manifold extending lengthwise of said cylinder block on one side thereof communicating with the exhaust ports.

16. A two-cycle engine, comprising a cylinder having a continuous belt of scavenging ports around the whole circumference of said cylinder, and a plurality of exhaust ports arranged in a row above the scavenging ports around only a part of the circumference of said cylinder, said cylinder having ribs separating said exhaust ports and other ribs separating said scavenging ports, said ribs of both sets extending longitudinally with respect to said cylinder and terminating in a common transverse wall separating the exhaust ports from the adjacent scavenging ports, said exhaust port ribs being offset relative to said scavenging port ribs so that they are substantially above the middle of the scavenging ports, whereby said transverse wall separating the sets of ports is free to deform with heat and flexibly connects the said sets of ribs.

17. A multi-cylinder two-cycle engine, comprising a cylinder block including a plurality of spaced substantially parallel cylinders, each of said cylinders having a continuous belt of scavenging ports around the whole circumference of said cylinder, and a plurality of exhaust ports arranged in a row above the scavenging ports around only a part of the circumference of said cylinder, each of said cylinders having ribs separating said exhaust ports and other ribs separating said scavenging ports, said ribs of both sets extending longitudinally with respect to said cylinder and terminating in a common transverse wall separating the exhaust ports from the adjacent scavenging ports, said exhaust port ribs being offset relative to said scavenging port ribs so that they are substantially above the middle of the scavenging ports, whereby said transverse wall separating the sets of ports is free to deform with heat and flexibly connects the said sets of ribs, ducts in said block between cylinders extending substantially parallel with respect thereto, and tie rods in said ducts rigidly interconnecting opposite end portions of said cylinders in said block, whereby to relieve said port ribs from tension stresses in the operation of the engine.

18. A multi-cylinder two-cycle engine, comprising a cylinder block including a plurality of spaced substantially parallel cylinders, each of said cylinders having a continuous belt of scavenging ports around the whole circumference of said cylinder, and a plurality of exhaust ports arranged in a row above the scavenging ports around only a part of the circumference of said cylinder, each of said cylinders having ribs separating said exhaust ports and other ribs separating said scavenging ports, said ribs of both sets extending longitudinally with respect to said cylinder and terminating in a common transverse wall separating the exhaust ports from the adjacent scavenging ports, and tie rods rigidly interconnecting opposite end portions of said cylinders in said block, whereby to relieve said port ribs from tension stresses in the operation of the engine.

19. A multi-cylinder two-cycle engine, comprising a cylinder block including a plurality of spaced substantially parallel cylinders, each of said cylinders having a continuous belt of scavenging ports around the whole circumference of said cylinder, and a plurality of exhaust ports arranged in a row above the scavenging ports around only a part of the circumference of said cylinder, each of said cylinders having ribs separating said exhaust ports and other ribs separating said scavenging ports, said ribs of both sets extending longitudinally with respect to said cylinder and terminating in a common transverse wall separating the exhaust ports from the adjacent scavenging ports, ducts in said block between cylinders extending substantially parallel with respect thereto, and tie rods in said ducts rigidly interconnecting opposite end portions of said cylinders in said block, whereby to relieve said port ribs from tension stresses in the operation of the engine, said block having water jacket portions, and certain of said ducts being formed as portions of hollow columns interconnecting spaced portions of the jacket through which cooling fluid is adapted to be circulated from one portion of the jacket to another.

20. A two-cycle engine, comprising a cylinder and a piston therein, said cylinder having a plurality of exhaust ports arranged in a row on one side of the cylinder in a plane normal to the axis of the cylinder, and a plurality of cross-flow scavenging ports arranged in a row in a plane parallel to the aforesaid plane under the exhaust ports for directing scavenging air tangentially over the top of the piston, and a plurality of upflow scavenging ports arranged in a row on the other side of the cylinder in the same plane with the cross-flow scavenging ports for directing scavenging air away from the piston toward the closed end of the cylinder, all of the scavenging and exhaust ports being symmetrical with respect to a longitudinal plane through the axis of said cylinder.

21. A two-cycle engine, comprising a cylinder and a piston therein, said cylinder having a plurality of exhaust ports arranged in a row on one side of the cylinder, and a plurality of cross-flow scavenging ports arranged in a row under the exhaust ports for directing scavenging air tangentially over the top of the piston, and a plurality of upflow scavenging ports arranged in a row on the other side of the cylinder for directing scavenging air away from the piston toward the closed end of the cylinder, all of the scavenging and exhaust ports being symmetrical with respect to a longitudinal plane through the axis of said cylinder, the closed end of the cylinder being cupola-shaped to facilitate return flow toward the exhaust ports.

22. A two-cycle engine, comprising a cylinder having a plurality of exhaust ports arranged in a row on one side of the cylinder in a plane normal to the axis of said cylinder, and scavenging ports under the exhaust ports and all in a plane parallel to the aforesaid plane including downflow and upflow scavenging ports all directed away from the exhaust ports and all arranged symmetrically with respect to a longitudinal plane through the axis of said cylinder.

23. A two-cycle engine, comprising a cylinder having a plurality of exhaust ports arranged in a row on one side of the cylinder in a plane normal to the axis of said cylinder, and scavenging ports under the exhaust ports and all in a plane parallel to the aforesaid plane including downflow and upflow scavenging ports all directed away from the exhaust ports and all arranged symmetrically with respect to a longitudinal plane through the axis of said cylinder, the closed upper end of the cylinder being cupola-shaped to facilitate return flow of air from the upflow scavenging ports toward the exhaust ports.

24. A two-cycle engine, comprising a cylinder and a piston therein, said cylinder having a plurality of exhaust ports of a predetermined height arranged in a row on one side of the cylinder in a plane normal to the axis of said cylinder, and a complete circle of scavenging ports in a plane parallel to the first plane including a plurality of cross-flow scavenging ports of a predetermined height under the exhaust ports for directing scavenging air tangentially over the top of the piston, and a plurality of upflow scavenging ports of appreciably greater height than the cross-flow scavenging ports on the other side of the cylinder from the cross-flow scavenging ports and exhaust ports for directing scavenging air away from the piston toward the closed end of the cylinder.

25. A two-cycle engine, comprising a cylinder and a piston therein, said cylinder having a plurality of exhaust ports of a predetermined height arranged in a row on one side of the cylinder in a plane normal to the axis of said cylinder, and a complete circle of scavenging ports in a plane parallel to the first plane including a plurality of cross-flow scavenging ports of a predetermined height under the exhaust ports for directing scavenging air tangentially over the top of the piston, and a plurality of upflow scavenging ports of appreciably greater height than the cross-flow scavenging ports on the other side of the cylinder from the cross-flow scavenging ports and exhaust ports for directing scavenging air away from the piston toward the closed end of the cylinder, all of the scavenging ports being symmetrical with respect to a longitudinal plane through the axis of said cylinder.

26. A two-cycle engine, comprising a cylinder and a piston therein, said cylinder having a plurality of exhaust ports of a predetermined height arranged in a row on one side of the cylinder in a plane normal to the axis of said cylinder, and a complete circle of scavenging ports in a plane parallel to the first plane including a plurality of cross-flow scavenging ports of a predetermined height under the exhaust ports for directing scavenging air tangentially over the top of the piston, and a plurality of upflow scavenging ports of appreciably greater height than the cross-flow scavenging ports on the other side of the cylinder from the cross-flow scavenging ports and exhaust ports for directing scavenging air away from the piston toward the closed end of the cylinder, the closed upper end of said cylinder being cupola-shaped so as to facilitate return flow of air from the upflow scavenging ports toward the exhaust ports.

HEINRICH SCHNEIDER.

---

Certificate of Correction

Patent No. 2,393,342.  January 22, 1946.

HEINRICH SCHNEIDER

It is hereby certified that errors appear in the above numbered patent requiring correction as follows: In the heading to the printed specification, lines 7 and 8, for "Adolph G. Schneider" read *Adolf G. Schneider*; page 5, second column, line 48, claim 19, for "packet" read *jacket*; and that the said Letters Patent should be read with these corrections therein that the same may conform to the record of the case in the Patent Office.

Signed and sealed this 28th day of May, A. D. 1946.

[SEAL]

LESLIE FRAZER,
*First Assistant Commissioner of Patents.* exhaust ports for directing scavenging air tangentially over the top of the piston, and a plurality of upflow scavenging ports arranged in a row on the other side of the cylinder for directing scavenging air away from the piston toward the closed end of the cylinder, all of the scavenging and exhaust ports being symmetrical with respect to a longitudinal plane through the axis of said cylinder, the closed end of the cylinder being cupola-shaped to facilitate return flow toward the exhaust ports.

22. A two-cycle engine, comprising a cylinder having a plurality of exhaust ports arranged in a row on one side of the cylinder in a plane normal to the axis of said cylinder, and scavenging ports under the exhaust ports and all in a plane parallel to the aforesaid plane including downflow and upflow scavenging ports all directed away from the exhaust ports and all arranged symmetrically with respect to a longitudinal plane through the axis of said cylinder.

23. A two-cycle engine, comprising a cylinder having a plurality of exhaust ports arranged in a row on one side of the cylinder in a plane normal to the axis of said cylinder, and scavenging ports under the exhaust ports and all in a plane parallel to the aforesaid plane including downflow and upflow scavenging ports all directed away from the exhaust ports and all arranged symmetrically with respect to a longitudinal plane through the axis of said cylinder, the closed upper end of the cylinder being cupola-shaped to facilitate return flow of air from the upflow scavenging ports toward the exhaust ports.

24. A two-cycle engine, comprising a cylinder and a piston therein, said cylinder having a plurality of exhaust ports of a predetermined height arranged in a row on one side of the cylinder in a plane normal to the axis of said cylinder, and a complete circle of scavenging ports in a plane parallel to the first plane including a plurality of cross-flow scavenging ports of a predetermined height under the exhaust ports for directing scavenging air tangentially over the top of the piston, and a plurality of upflow scavenging ports of appreciably greater height than the cross-flow scavenging ports on the other side of the cylinder from the cross-flow scavenging ports and exhaust ports for directing scavenging air away from the piston toward the closed end of the cylinder.

25. A two-cycle engine, comprising a cylinder and a piston therein, said cylinder having a plurality of exhaust ports of a predetermined height arranged in a row on one side of the cylinder in a plane normal to the axis of said cylinder, and a complete circle of scavenging ports in a plane parallel to the first plane including a plurality of cross-flow scavenging ports of a predetermined height under the exhaust ports for directing scavenging air tangentially over the top of the piston, and a plurality of upflow scavenging ports of appreciably greater height than the cross-flow scavenging ports on the other side of the cylinder from the cross-flow scavenging ports and exhaust ports for directing scavenging air away from the piston toward the closed end of the cylinder, all of the scavenging ports being symmetrical with respect to a longitudinal plane through the axis of said cylinder.

26. A two-cycle engine, comprising a cylinder and a piston therein, said cylinder having a plurality of exhaust ports of a predetermined height arranged in a row on one side of the cylinder in a plane normal to the axis of said cylinder, and a complete circle of scavenging ports in a plane parallel to the first plane including a plurality of cross-flow scavenging ports of a predetermined height under the exhaust ports for directing scavenging air tangentially over the top of the piston, and a plurality of upflow scavenging ports of appreciably greater height than the cross-flow scavenging ports on the other side of the cylinder from the cross-flow scavenging ports and exhaust ports for directing scavenging air away from the piston toward the closed end of the cylinder, the closed upper end of said cylinder being cupola-shaped so as to facilitate return flow of air from the upflow scavenging ports toward the exhaust ports.

HEINRICH SCHNEIDER.

---

Certificate of Correction

Patent No. 2,393,342.

January 22, 1946.

HEINRICH SCHNEIDER

It is hereby certified that errors appear in the above numbered patent requiring correction as follows: In the heading to the printed specification, lines 7 and 8, for "Adolph G. Schneider" read *Adolf G. Schneider*; page 5, second column, line 48, claim 19, for "packet" read *jacket*; and that the said Letters Patent should be read with these corrections therein that the same may conform to the record of the case in the Patent Office.

Signed and sealed this 28th day of May, A. D. 1946.

[SEAL]

LESLIE FRAZER,
*First Assistant Commissioner of Patents.*